(12) United States Patent
Berstis

(10) Patent No.: US 6,918,283 B2
(45) Date of Patent: Jul. 19, 2005

(54) SYSTEM AND METHOD FOR DEMONSTRATING AND INVESTIGATING BROWNIAN MOTION EFFECTS ON A DIAMAGNETICALLY SUSPENDED PARTICLE

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/755,958

(22) Filed: Jan. 12, 2004

(65) Prior Publication Data

US 2005/0103104 A1 May 19, 2005

Related U.S. Application Data

(63) Continuation-in-part of application No. 10/455,158, filed on Jun. 5, 2003, now Pat. No. 6,799,462, and a continuation-in-part of application No. 10/607,487, filed on Jun. 26, 2003, now Pat. No. 6,832,518.

(51) Int. Cl.[7] .......................... F16C 39/06; H02K 7/09; G01C 9/06
(52) U.S. Cl. .................. 73/24.06; 73/25.02; 73/25.05; 73/31.05; 73/32 A; 73/653; 73/655; 33/345
(58) Field of Search .................. 73/570.5, 514.16, 73/514.17, 514.31, 432.1, 382, 643, 24.01, 73/24.06, 25.01, 25.02, 25.05, 31.05, 32 A, 73/652, 653, 655–657; 310/90.5; 33/344–345; 367/185–188

(56) References Cited

U.S. PATENT DOCUMENTS

| | | | | |
|---|---|---|---|---|
| 3,626,364 A | * | 12/1971 | Simon et al. ............... | 367/185 |
| 3,732,014 A | * | 5/1973 | Uzgiris ....................... | 356/336 |
| 3,815,963 A | * | 6/1974 | Wilk .......................... | 310/90.5 |
| 4,142,417 A | | 3/1979 | Cashdollar et al. ......... | 370/110 |
| 4,344,235 A | * | 8/1982 | Flanders ................... | 33/366.12 |
| 4,394,575 A | | 7/1983 | Nelson ....................... | 250/343 |
| 5,021,980 A | | 6/1991 | Poenisch et al. ............ | 702/134 |
| 5,116,137 A | | 5/1992 | Xiong et al. ................ | 374/132 |
| 5,203,209 A | * | 4/1993 | Watkins et al. ............ | 73/570.5 |
| 5,316,385 A | * | 5/1994 | Thomas ...................... | 374/130 |
| 5,396,136 A | * | 3/1995 | Pelrine ...................... | 310/90.5 |
| 5,772,323 A | | 6/1998 | Felice ........................ | 374/127 |
| 5,803,607 A | | 9/1998 | Jones et al. ................. | 374/161 |

(Continued)

OTHER PUBLICATIONS

"Temperature Measurement at the End of a Cantilever Using Oxygen Paramagnetism in Solid Air" by Ken R. Thurber, et al., of US Army Research Laboratory.

(Continued)

Primary Examiner—Hezron Williams
Assistant Examiner—Rose M. Miller
(74) Attorney, Agent, or Firm—Robert H. Frantz; David A. Mims, Jr.

(57) ABSTRACT

An apparatus for demonstrating, investigating and observing Brownian motion and temperature of a medium, such as gas or liquid, uses a small particle which is diamagnetically suspended in the medium. The tiny magnetized particle having a known mass is levitated using a diamagnetic technique, and the displacement of the particle over time is observable, which can be used to determine a temperature of the medium. Optionally, a second particle is suspended in a vacuum but mechanically connected to the same apparatus as the first enclosure with the first particle, thereby allowing observation and measurement of non-Brownian movement of the structure, and allowing more precise observation of Brownian movement effects on the first suspended particle.

12 Claims, 4 Drawing Sheets

U.S. PATENT DOCUMENTS

| | | | | |
|---|---|---|---|---|
| 5,815,611 A | * | 9/1998 | Dhadwal | 385/12 |
| 5,955,800 A | * | 9/1999 | Shearwood et al. | 310/40 MM |
| 6,422,745 B1 | | 7/2002 | Glasheen et al. | 374/131 |

OTHER PUBLICATIONS

"Brownian Motion" by Britannica, downloaded from http://www.britannica.com on Sep. 18, 2003, 3 pages.

"Brownian Motion" downloaded from http://physics.nad.ru on Sep. 18, 2003, 1 pages.

"Brownian Motion" by Bill Willis, downloaded from http://www.geocities.com/thesciencefiles on Sep. 18, 2003, 2 pages.

* cited by examiner

SYSTEM AND METHOD FOR DEMONSTRATING AND INVESTIGATING BROWNIAN MOTION EFFECTS ON A DIAMAGNETICALLY SUSPENDED PARTICLE

CROSS-REFERENCE TO RELATED APPLICATIONS (CLAIMING BENEFIT UNDER 35 U.S.C. 120)

The present application is a continuation-in-part of U.S. patent application Ser. No. 10/455,158, filed on Jun. 5, 2003, now U.S. Pat. No. 6,799,462, and of U.S. patent application Ser. No. 10/607,487 filed on Jun. 26, 2003 now U.S. Pat. No. 6,832,518, currently under Notice of Allowability, both by Viktors Berstis, commonly assigned to applicant of the present application.

INCORPORATION BY REFERENCE

The related U.S. patent application Ser. Nos. 10/455,158 and 10/607,487, filed on Jun. 5, 2003, and Jun. 26, 2003, respectively, both by Viktors Berstis, are incorporated by reference in their entireties, including drawings.

FEDERALLY SPONSORED RESEARCH AND DEVELOPMENT STATEMENT

This invention was not developed in conjunction with any Federally sponsored contract.

MICROFICHE APPENDIX

Not applicable.

BACKGROUND OF THE INVENTION

1. Field of the Invention

This invention relates to technologies for measuring temperature of a gas, and especially for measuring extremely low temperatures.

2. Background of the Invention

There are a wide range of instruments and devices employed to measure temperature for scientific and engineering purposes. Common techniques employed for measuring temperatures of large amounts or samples of liquid or gas include use of expansive metals and thermocouples.

In techniques employing expansive metals, a metal which has a measurable coefficient of expansion relative to temperature, such as mercury, is immersed in the sample of gas or liquid to be measured. After allowing the metal time to reach the mean temperature of the sample material, the length or size of the piece of metal is measured, usually optically, and correlated to an known expansion chart or graph to determine the temperature of the sample material.

Thermocouples provide an electronic method for measuring temperature, in which a bimetallic junction is employed to measure temperature of a gas or liquid sample. Two dissimilar metals are joined together, such as by vacuum deposit or by melting, to form a junction which generates a tiny electromotive force ("EMF") according to the temperature of the junction. In some situations, two wires of differing metals are twisted together, thereby forming the mechanical junction between the metals, and secured in place through applying a small amount of epoxy to the twisted area. The junction is immersed in the sample liquid or gas, allowed time to assume the temperature of the sample material, and a millivoltmeter is used to measure the EMF of the junction. This is correlated to a known characteristic profile of the junction EMF to temperature to arrive at a temperature measurement.

Both the thermocouple and the expansive metal approaches, however, have the possibility of changing the temperature of the sample being measured, especially for very small samples of gas or liquid. This disadvantage arises out of the fact that the thermocouple or metal each contains its own amount of thermal energy prior to being immersed in the sample material, and when immersed, adds (or subtracts) thermal energy to (or from) the sample material in order to assume the same temperature of the sample.

Additionally, these methods require a waiting period for the measuring device to equalize with the temperature of the sample, which may not be conducive to processes requiring more rapid temperature measurements for purposes of process control, manufacturing automation, etc.

For extremely low temperatures, these devices and techniques are inadequate. For example, many research experiments, fabrication processes, and reactions are undertaken at temperatures well below 0 Celsius, approaching just a few hundred degrees Kelvin. In such a situation, measuring the temperature of the gas or solid under test or within the reaction poses special problems, as most methods of probing the gas or solid create the potential of changing the temperature, or require structures too small for practical implementation.

One known technique for such low temperature applications and small sample size measurement has been proposed by Thurber, et al., in "Temperature Measurement at the End of a Cantilever Using Oxygen Paramagnetism in Solid Air" of the U.S. Army Research Laboratory. It employs a small amount of frozen air doped onto or around a small sample. The sample is placed at the end of a thin cantilever structure. Oxygen is known to be weakly diamagnetic in a manner related to temperature at extremely low temperatures (e.g. where oxygen is a solid). Thus, the cantilever containing the frozen-oxygen doped sample is measurably deflected an amount due to the paramagnetic attraction of the oxygen to another magnetic source. The deflection amount of the cantilever is correlated to a known function of oxygen paramagnetic properties with respect to temperature to arrive at a temperature of the sample.

This approach, while useful for cantilever magnetometry and Magnetic Resonance Force Microscopy ("MRFM") experiments, suffers from a number of limitations and disadvantages. Most notably, it is not operable at sample temperatures above the temperature of sublimation of oxygen, and thus is not useful for a wide range of interesting applications. Additionally, it is not applicable to scenarios where a thin cantilever device is impractical.

Therefore, there is a need in the art for a system and method of quickly measuring temperature, including very low temperatures as well as higher temperatures, of a small volume of gas or liquid, without removing or adding a substantial amount of heat to the sample material from the measuring device.

BRIEF DESCRIPTION OF THE DRAWINGS

Preferred embodiments of the present invention will now be described by way of example only, with reference to the accompanying drawings in which.

SUMMARY OF THE INVENTION

Figure 1:
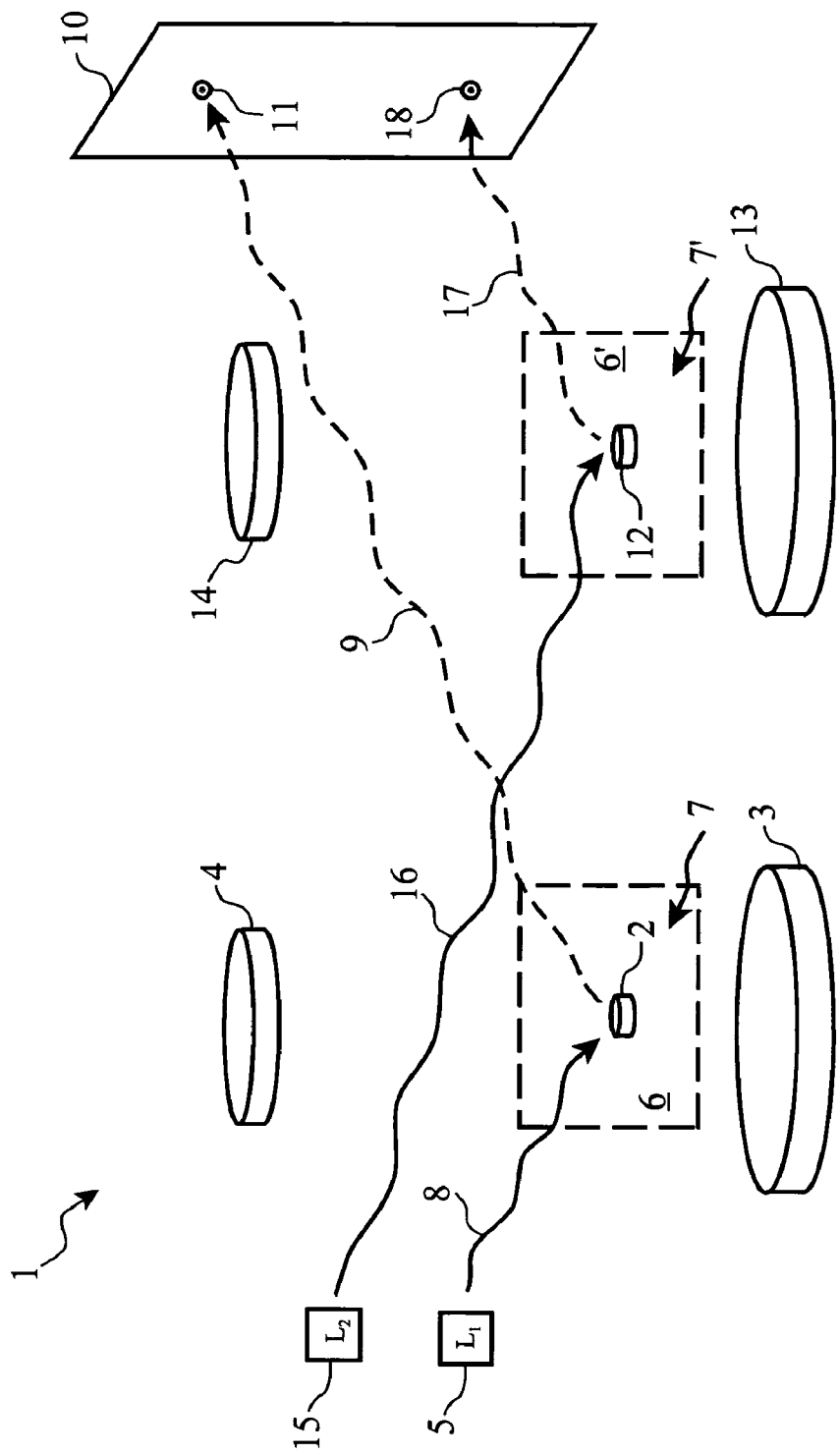
FIG. 1 illustrates an arrangement according to the present invention in which one or more magnetic particles are diamagnetically suspended within a medium under test.

This invention provides a method of demonstrating and investigating Brownian motion effects as they are related to a gas temperature by observing the amount of Brownian motion of a small particle impacted by gas molecules in which it is suspended. A tiny magnetized particle is levitated using a diamagnetic technique similar to that described in the related patent applications, which requires no mechanical support for the particle (e.g. no cantilevers, no pedestal, etc.).

As the small, levitated particle is subjected to collisions with gas molecules surrounding it, it is displaced in a random motion described by the Brownian Motion equations and principles. This displacement is observed and demonstrated by shining a light on the particle such that it is reflected to a collector plate, or directly observed by a device such as a microscope.

To further enhance the observation and investigation, a second particle is also diamagnetically suspended by a similar arrangement or device, although it is suspended in a relative vacuum instead of a gas. The second particle is configured at a distance sufficient so as not to magnetically interact with the first suspended mass (or with suitable magnetic shielding between the two).

By having a second particle suspended in a vacuum, its movement will not be affected by Brownian motion, and will represent only vibration of the overall apparatus such as by mechanical interference, which will also effect the first suspended particle. This common vibration, however, will affect both particles similarly, and thus will manifest itself in a common mode movement between the two particles. Depending on the type of material whose temperature is being measured, the first particle may encounter damping in its motion. This may need to be considered in measurements, according to the characteristics of material being measured.

Thus, by observing both particles' movement simultaneously and over time, a filter can be employed to effectively allow demonstration and investigation of only the Brownian movement of the first particle, thereby yielding a demonstration relative to the temperature of the gas which is insensitive to external mechanical and electromechanical noise.

DESCRIPTION OF THE INVENTION

The present invention differs from the proposed approach by Thurber in two major aspects. First, Thurber proposes ignoring effects of Brownian motion on the sample material, suspending the sample mechanically using a thin cantilever, and using paramagnetic properties of a doping agent (e.g. frozen oxygen) to bend the cantilever according to the temperature of the sample. Our method, however, employs the Brownian Motion effects (instead of ignoring them) as the primary temperature measuring mechanism, suspends a particle in the sample using diamagnetics (as opposed to using a mechanical support such as a cantilever), and requires no doping of the sample (e.g. requires no frozen oxygen), and therefore is useful at much higher sample temperatures.

As Brownian Movement effects are not ignored by our approach, we first present an overview of Brownian motion phenomena.

Brownian Motion Phenomena

Brownian Motion, also referred to as Brownian Movement, is a well-known physical phenomena in which a mass suspended or contained in a second material is constantly in random motion due to random impacts by the molecules of the surrounding material. Brownian movement is most observable in a microscope using small masses, such as pollen spores, suspended in a fluid.

According to this well-known theorem, the mean kinetic energy of a particle suspended in a liquid can be determined by the following equation:

$$E = 0.5 \cdot m \cdot v^2 = (3 \cdot k \cdot T)/2 \qquad \text{Eq. 1}$$

wherein m is the mass of a particle of the liquid or gas being observed or investigated, v is the particle's velocity, k is the Boltzmann constant, and T is the temperature of the surrounding matter (liquid or gas). A common value employed for the Boltmann constant is $1.380662 \times 10^{-23}$ J K$^{-1}$. The multiplier "3" preceding the Boltzmann constant represents the three degrees of freedom (e.g. x, y and z directions), but may set to alternate values depending on other degrees of freedom, such as rotational directions, or may be set to another scaling factor, depending on the nature of the material being observed or investigated.

If all of the quantities of this equation are known except temperature T, then temperature can be determined in a straightforward manner using standard algebraic operations.

Our Investigation and Demonstration Device Structure

According to a first aspect of the present invention, a small particle is levitated without mechanical support within a small volume of gas, as shown in FIG. 1. An amount of gas (7) for which its temperature is to be measured is provided in an enclosure (6). Within the enclosure (6) is suspended a first small particle (2) using diagmagnetism, as described in the related patent applications. To briefly review the diagmagnetic levitation method of the related applications, the base (3) is comprised of any suitable form of carbon which exhibits diamagnetic properties, and particularly graphite and pyrolytic graphite. Bismuth is known also to have diamagnetic properties. Alternatively, superconductors, which are highly diamagnetic, may be used at sufficiently low temperatures.

An upper permanent magnet (4), such as a magnet comprised of Neodymium-Boron-Iron compound, is configured above the base (3), to assist in offsetting the weight of a small levitated mass (2) which is positioned between the base (3) and the upper magnet (4). The levitated mass (2) is comprised of a magnetic material, such a Neodymium Boron Iron magnet preferably, or alternatively a Samarium Cobalt magnet. The shape of the levitated mass is preferably round, but may be of other shapes in alternate embodiments. The levitated mass (2) is maintained in a quasi-stable position between the base and the upper magnet immersed in the surrounding gas or liquid (7) contained by the enclosure (6). FIG. 1 shows the enclosure with the base (3) and upper magnet (4) outside the enclosure, but alternate embodiments may include one or both of these components within the enclosure.

The levitated mass (2) is of sufficiently small mass to be observably affected by Brownian movement of the gas molecules (7). So, a first light source (5) is directed so as to be incident (8) on the first particle, the levitated mass (2). The light source is arranged with respect to the enclosure so as to shine through a suitably transparent window or port in the enclosure (not shown), or the enclosure may be entirely constructed of transparent material (e.g. glass or plastic for visible wavelength lasers, Germanium for infra-red sources, etc.). Alternatively, the light source (5) can be placed within the volume of gas or liquid, but this may cause some changes to the energy (and temperature) of the material in some possible configurations.

The reflected light (9) is directed out of another transparent window (not shown) in the enclosure (6) such that it is incident at a point (11) on an observation plate (10).

Brownian Effects Demonstration and Observation

As the particle (2) is subjected to the random movements of Brownian motion of the gas or liquid in which it is suspended, the point of incidence (11) of the reflected beam (9) on the collection plate (10) (or shadow) will change over time randomly as well. The amount of movement is related to the temperature of the gas (7).

Brownian motion is fundamentally caused by the smaller particles randomly imparting momentum on the larger particle such that the average energy of all of the particles is the same. The average energy of the particles is given by the equation:

$$E = \tfrac{1}{2} m \cdot v^2 = (3 \cdot k \cdot T)/2 \qquad \text{Eq. 2}$$

wherein E is the mean kinetic energy of a particle, m is the known mass of the particle, v is the particle's velocity, and k is the Boltzmann constant. However, it is unclear whether or not this equation fully describes the movement of a larger mass suspended in a matter such as a gas. Other factors may need to be considered in equations or calculations to describe the motion, which may be investigated using our invention. These factors include, but are not limited to, the slight centering force the upper magnet induced on the larger test particle, the fact that motion may be observed in a single plane rather than in three dimensions, and that our ability to observe motions below a certain size scale may be limited. Since Brownian motion is fractal in nature, an investigator is able to use this fact to deduce the smaller scale motions that the test particle is undergoing as a function of the larger observed motions. The smaller scale motions may be below the resolution power of the observation system. These factors may be accounted for by experimentally determining their effect on the ideal equations given.

For example, one theory states that if the motion of the large particle is due to collisions with the smaller particles, then the average momenta of small and large particles are the same. Say that you measure the average momentum of the large particle and get the value:

$$P = v_1 \cdot m_1 \qquad \text{Eq. 3}$$

wherein P is the average momentum of a small particle, and so the small particle has average energy:

$$E = P^2/(2 \cdot m_2) \qquad \text{Eq. 4}$$

Since the temperature T of the gas and the average energy E of its particles are related by the equation:

$$E = (3/2) \cdot k \cdot T \qquad \text{Eq. 5}$$

where k is Boltzmann's constant, we can derived the equation:

$$(3/2) \cdot k \cdot T = P^2/(2 \cdot m_2) \qquad \text{Eq. 6}$$

which relates the average momentum P of the big particle to the temperature T of the gas. From this equation, it is apparent that mass $m_2$ is significant, but the distance of a "leg" of motion of the large particle is not important. In the previous equations, the following variables and constants represent:

P is the average momentum of big floating particle, such as our suspended magnet;

E is the average energy of the surrounding gas/liquid particles;

$v_1$ is the average velocity of big floating particle;

$m_1$ is the mass of big floating particle;

$m_2$ is the mass of surrounding gas or liquid particles;

T is temperature; and k is Boltzmann's constant.

From these equations, and conserving momentum, we can postulate that the temperature of the gas in which a relatively large particle, such as our magnet, is suspended is described by the equation:

$$T = (v_1 \cdot m_1)^2/(k \cdot 3 \cdot m_2) \qquad \text{Eq. 7}$$

However, it is believed that there may be some other factors that need to be considered for suspension in a liquid, such as the attraction between particles. The structure of the present invention should be instrumental in determining the accuracy of these equations, and observing any other phenomena which may occur under such conditions.

Figure 2:
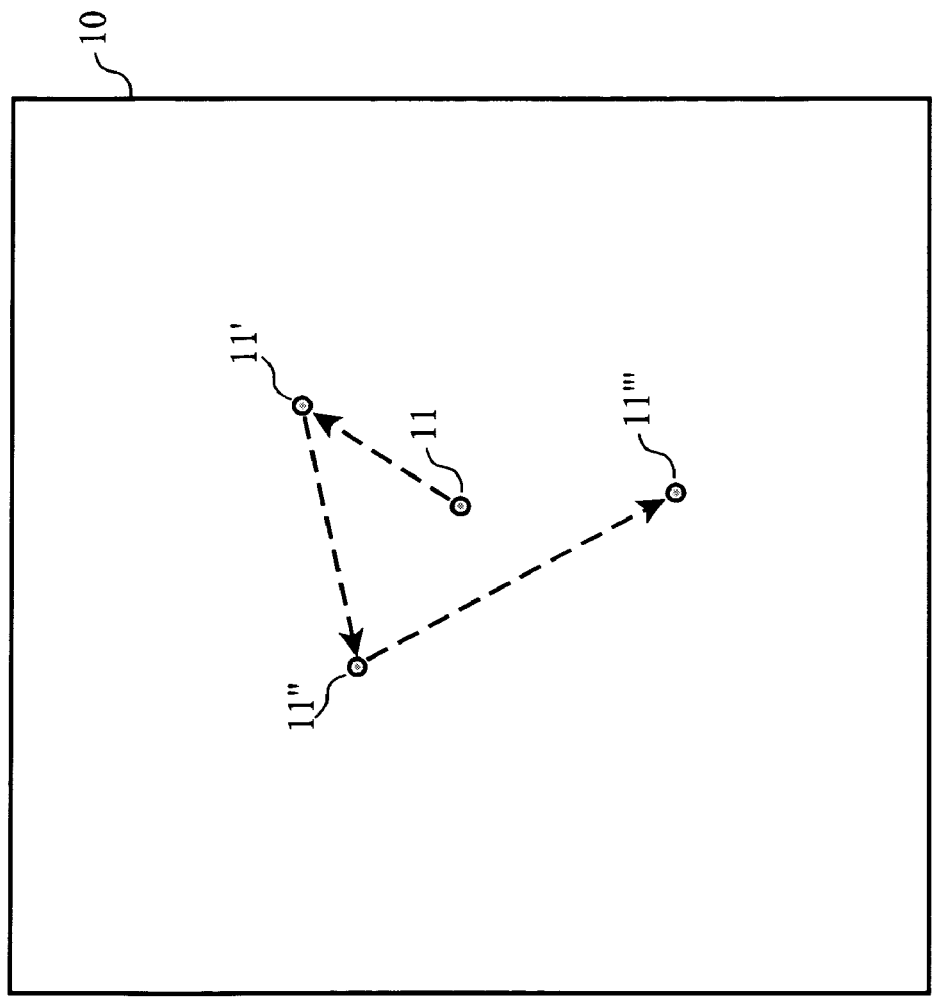
FIG. 2 illustrates a measurable random change in point of incidence of a reflected laser beam with a collection plate, according to the present invention.

Turning now to FIG. 2, the point of incidence on the collection plate (10) of the reflected light beam is observable over time for random movement and displacement. The collection plate may be any system which can sense the incidence of the light on a planar structure, such as a capacitively-coupled device ("CCD") imaging array, or a white screen with a digital camera focused on it. The position of the point of incidence, or "dot" may be observed over time (11, 11', 11", 11''', etc.).

Embodiment with Simultaneous Observation of Non-Brownian Effects

According to another aspect of the present invention, and returning to FIG. 1, a second mass (12) of equivalent mass to the first mass (2), is diamagnetically suspended in a relative vacuum (7') within another enclosure (6') over a base (13) and an upper magnet (14) in the same manner as the first particle (2) is levitated. The upper and lower magnets, as well as the enclosures are mechanically coupled to each other through a structure for the entire demonstration apparatus such that mechanical vibrations or movements in one set of magnets and an enclosure are coupled to the other set of magnets and enclosure.

The enclosures (6, 6') are sufficiently spaced apart so as to provide magnetic shielding between the suspended particles (2, 12), or alternatively, the enclosures (6, 6') are partially constructed of magnetically shielding material.

Figure 3:
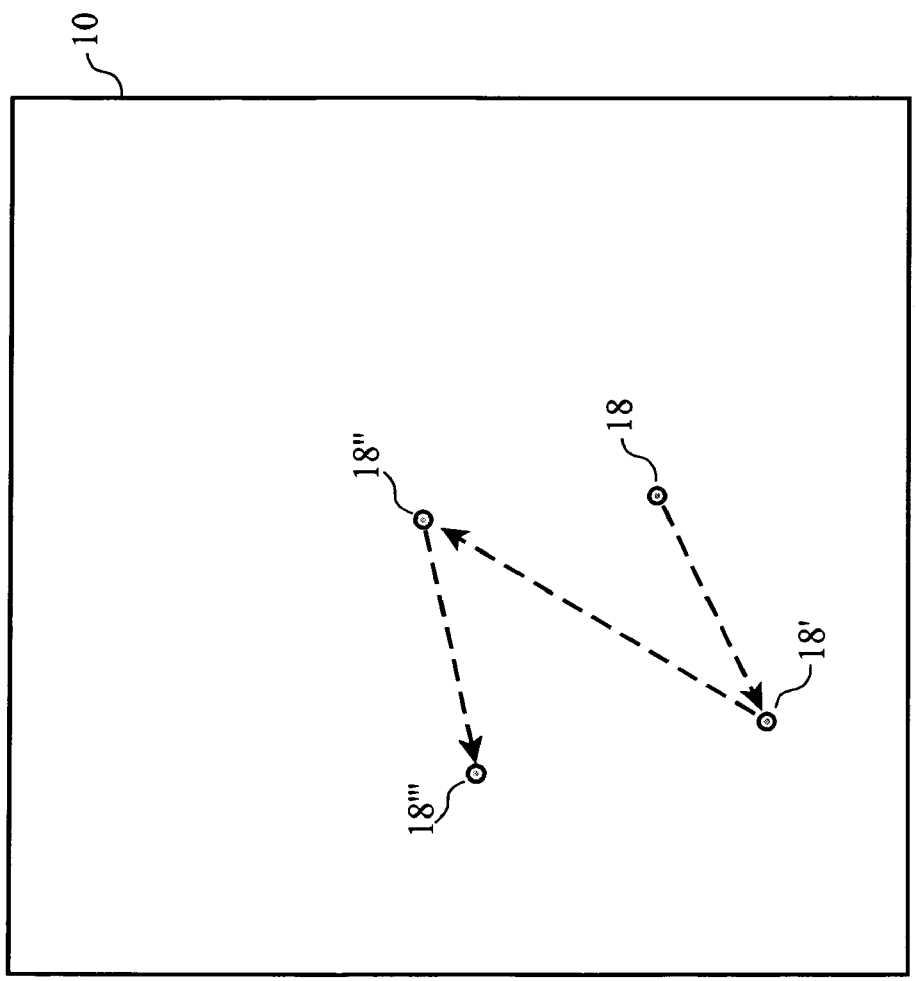
FIG. 3 provides an illustration of a measurable change in point of incidence of a second reflected laser beam with a collection plate, the movement of which is random but otherwise uncorrelated with the movement illustrated by FIG. 2, according to the present invention.

A second light source (15) is shined (16) on the second particle (12) such that a second reflected beam (17) is incident at a point (18) on the collection plate (10), and moves with random displacement over time as shown in FIG. 3 (18, 18', 18", 18''', etc.).

As any mechanically induced movement of the second particle (12) such as through vibration of the assembly, and any electro-magnetically ("EM") induced movement of the second particle (12) such as existence of a time-varient EM field from a motor, speaker or transformer, will also be induced into the first particle (2), and will be correlated to each other (e.g. similar and in the same direction). These types of induced movement are not related to the temperature of the gas (7), and thus represents "noise" in the "signal" given by the points of incidence (11, 18) of the reflected laser beams (9, 17).

Since this noise is "common mode" noise, the observed movement of the second particle can be "subtracted" from the movement of the first particle, the difference being representative of the Brownian movement of the first particle from the interaction with the gas in which it is suspended.

Additional Embodiment Alternatives

Figure 4:
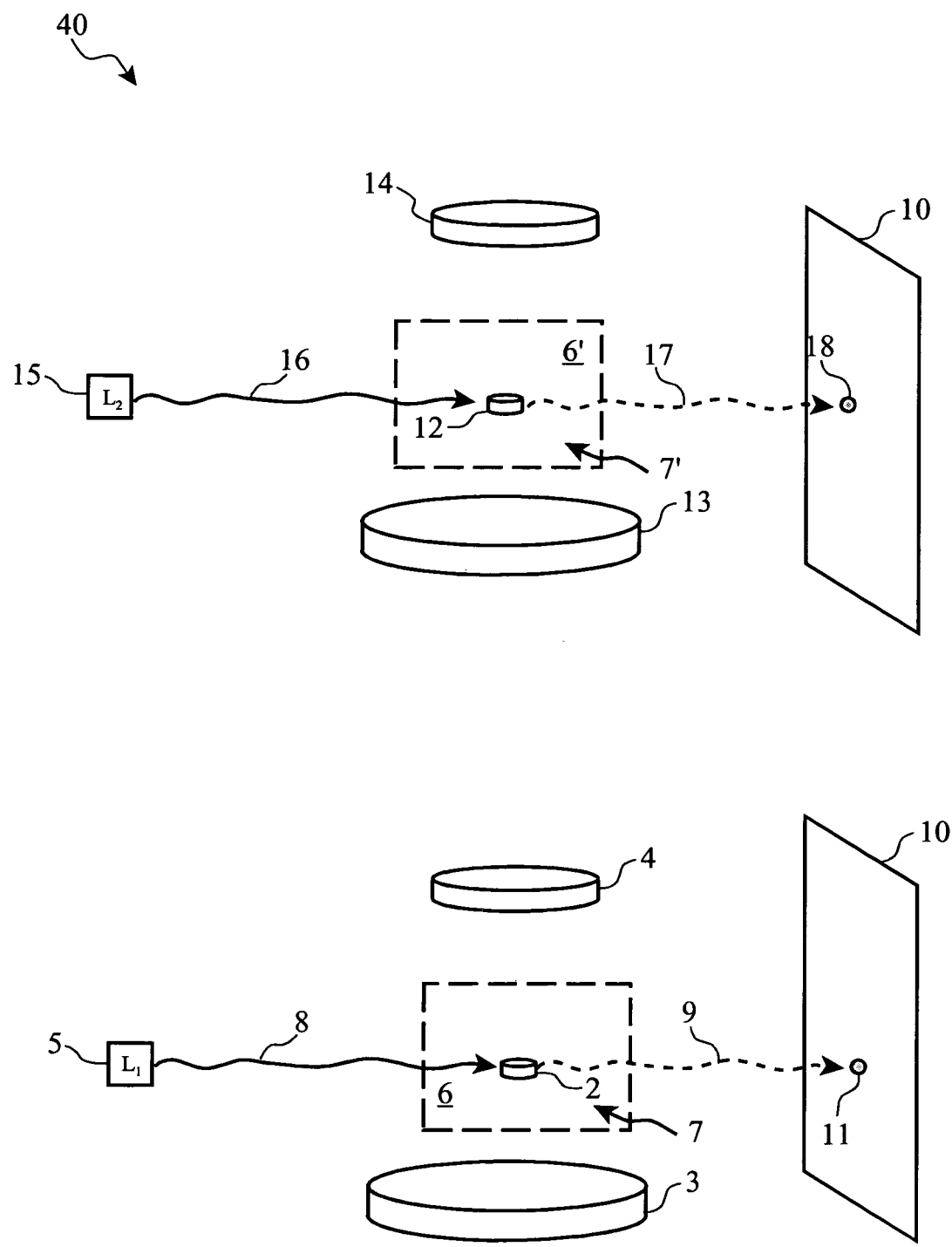
FIG. 4 depicts an alternate mechanical configuration according to the present invention.

Turning to FIG. 4, an alternate arrangement of the two magnet and enclosure sets is shown, configured in a vertical arrangement one above the other (instead of side by side). This arrangement allows for the incident light (8, 16) to cast a shadow on the screen (10), rather than to reflect from the surface of the particle. It is anticipated that this arrangement may be more useful in some scenarios and situations that the primary configuration of FIG. 1.

CONCLUSION

As many details of a preferred embodiment have been disclosed, and as several optional features of embodiments have been shown, it will be recognized by those skilled in the art that these are illustrative of the invention, but do not define the scope of the invention. Certain substitutions, variations and equivalent elements and steps may be employed without departing from the spirit and scope of the invention. Therefore, the scope of the present invention should be determined by the following claims.

What is claimed is:

1. A method for arranging components for investigating the effects of Brownian motion relative to temperature of a non-solid medium, said method comprising the steps of:
   enclosing an amount of a non-solid medium for investigation in a first enclosure;
   arranging a diamagnetic base and a magnetic particle with respect to said first enclosure such that said magnetic particle is diamagnetically suspended within said medium without mechanical support, said magnetic particle having sufficiently small mass so as to be measurably displaced over time by Brownian Motion of said medium; and
   providing a means for observing and measuring the movement and displacement of said suspended particle over time.

2. The method as set forth in claim 1 wherein said step of providing a means for observing displacement of said suspended particle over time comprises:
   providing a collection plate; and
   arranging a light source to shine onto a surface of said suspended magnetic particle in a configuration such that the light is reflected off the magnetic particle and onto a collection plate.

3. The method as set forth in claim 1 wherein said step of providing a means for observing displacement of said suspended particle over time comprises:
   providing a collection plate; and
   arranging a light source to shine onto a surface of said suspended magnetic particle opposite of said collection plate such that a shadow is produced by the suspended particle on said collection plate.

4. The method as set forth in claim 1 further comprising:
   providing a second diamagnetically suspended magnetic particle within a second enclosure in which a relative vacuum is maintained,
   arranging a second light source to shine on said second particle, and
   mechanically coupling said first enclosure, second enclosure, and said magnets so as to equally induce equivalent movement and vibrations which are due to non-Brownian sources, thereby allowing simultaneous observation of non-Browian movement of the second particle, and combined Brownian and non-Brownian movement of the first particle.

5. The method as set forth in claim 1 further comprising the step of providing a gas medium in which said first magnetic particle is suspended.

6. The method as set forth in claim 1 further comprising the step of providing a liquid medium in which said first magnetic particle is suspended.

7. An apparatus for demonstrating and observing the effects of Brownian motion relative to temperature of a non-solid medium, said apparatus comprising:
   a first enclosure containing an amount of a non-solid medium for investigation;
   a diamagnetic base and a magnetic particle arranged with respect to said first enclosure such that said magnetic particle is diamagnetically suspended within said medium without mechanical support, said magnetic particle having sufficiently small mass so as to be measurably displaced over time by Brownian Motion of said medium; and
   a means for observing and measuring the movement and displacement of said suspended particle over time.

8. The apparatus as set forth in claim 7 wherein a means for observing displacement of said suspended particle over time comprises:
   a collection plate; and
   a light source arranged to shine onto a surface of said suspended magnetic particle in a configuration such that the light is reflected off the magnetic particle and onto a collection plate.

9. The apparatus as set forth in claim 7 wherein said a means for observing displacement of said suspended particle over time comprises:
   a collection plate; and
   a light source arranged to shine onto a surface of said suspended magnetic particle opposite of said collection plate such that a shadow is produced by the suspended particle on said collection plate.

10. The apparatus as set forth in claim 7 further comprising:
    a second magnetic particle diamagnetically suspended within a second enclosure in which a relative vacuum is maintained,
    a second light source arranged to shine on said second particle, and
    a structure for mechanically coupling said first enclosure, second enclosure, and said magnets so as to equally induce equivalent movement and vibrations which are due to non-Brownian sources, thereby allowing simultaneous observation of non-Browian movement of the second particle, and combined Brownian and non-Brownian movement of the first particle.

11. The apparatus as set forth in claim 7 further comprising a gas medium contained by said first enclosure in which said first magnetic particle is suspended.

12. The apparatus as set forth in claim 7 further comprising a liquid medium contained by said first enclosure in which said first magnetic particle is suspended.

* * * * *